United States Patent Office 2,717,835
Patented Sept. 13, 1955

2,717,835

TREATMENT OF PROTEINACEOUS MATERIALS

Julius Brody, Dorchester, Mass.

No Drawing. Application July 31, 1951,
Serial No. 239,637

5 Claims. (Cl. 99—7)

This invention relates to the treatment of certain proteinaceous materials, and in particular to a process of liquefying proteinaceous materials to prepare or recover nutritional food supplements or concentrates from them.

The process of this invention may be used to liquefy or solubilize a number of proteinaceous materials, particularly animal tissues of a soft texture. Specifically it has been found effective on the entire protein of fish, including meat, entrails, skin, scales and fins, but not the skeleton and eyeballs, and on the major proportion of the protein found in the entrails of poultry and mammals, with the exception of the stomachs. It is contemplated that the greatest field of utility of this invention lies in the utilization of fish by-products, and it is with specific reference to the solubilization of fish proteins that this invention is described in detail.

Fish by-products present an important source of supplemental food values including vitamins, hormones, minerals and a variety of proteins. Many of these products, such as the entrails from commercial food fish, are generally thrown overboard to conserve valuable storage space on shipboard and also because of their susceptibility to rapid decomposition which would necessitate for their preservation either mechanical refrigeration or the use of chemical preservatives. When food supplements are recovered from such waste materials, the waste materials are generally ground mechanically and further treated to remove their nutritional elements or dried and used in fertilizers. Because stones and pebbles, which are frequently found in many fish stomachs become lodged in the grinding apparatus to damage it or require its shutdown, mechanical grinding has not proved entirely satisfactory.

Other fish by-products are considered of sufficient value to justify their utilization. For instance fish livers are pressed to recover their high vitamin oil. Press water, that is aqueous body fluids pressed from fish generally after cooking, is often concentrated as much as is possible without gel formation also to be utilized as a source of vitamins.

This invention provides a novel process of both liquefying and preserving proteinaceous products, including fish entrails, livers, and scraps which may be practiced inexpensively without mechanical grinding to produce a product rich in supplemental food values. This process may be conveniently practiced aboard ship and the liquefied product produced may be stored for several weeks without refrigeration in parts of the ship not adapted to fish storage. One feature of this invention is that the liquefied product may be concentrated in its solids content, thereby becoming so well preserved that it may be kept unrefrigerated for months. A further aspect of the solubilization process of this invention is that it requires no heat and only a slight amount of mechanical energy in the form of occasional stirring. The concentrated or unconcentrated liquid produced by this invention may be handled with ease, and pebbles and other foreign solids may be strained from it.

This invention also has utility in the processing of press water which, if used at all, is concentrated to a solids content of generally about fifty percent. At this concentration there is a tendency for the press water to solidify when cooled, forming a gelatinous material which cannot be easily handled. The process of this invention may be utilized to effect liquidization and preservation of gelled press water, or to prevent gellation, resulting in a fluid concentrate having far higher solids content than has heretofore been considered practical.

This invention is based chiefly on the discovery that solubilization of such proteinaceous materials may be effected by adding urea to them. After about four or six days, depending in part on the temperature of the mixture and degree of agitation, the protein is completely liquefied. Moreover, during this solubilization period no discernible biological decomposition, such as fermentation or putrefaction, occurs, provided the urea concentration is satisfactorily high. This solubilization process is carried out without heating, preferably at a temperature below 30° C. At higher temperatures there is some tendency towards gellation, probably the result of a partial polymerization of the urea and protein.

Solubilized fish entrails which result from this process may be strained to remove pebbles, and further processed to recover the vitamins and other food values. It may be used either directly or after concentration to a solids content of from about thirty percent or more by weight as a plant food, by spraying it on the soil and turning it in. As a supplement to poultry feed it is desirable to concentrate it to between fifty to sixty-five percent solids to form a thick liquid which may be added directly to the feed, from two to three percent based on the weight of the feed being sufficient. In its concentrated form the product is physically stable so that stratification does not occur to any appreciable extent. Moreover concentration does not markedly affect the pH of the material; the concentrated product is substantially neutral in its hydrogen ion concentration. It has been found that sixty-seven percent by weight of solids is the practical maximum attainable without the material becoming too viscous to handle easily.

The amount of urea that should be added to effect solubilization and preservation has been found to be in the range of ten to twenty percent by weight. Solubilization may be effected with lower concentrations, but the mixture is not well preserved, and at concentrations in the neighborhood of five percent the urea tends to promote rather than impede the biological decomposition processes. Concentrations above twenty percent are entirely usable, but unnecessary.

Accordingly, to process fish entrails according to this invention, urea in an amount of from about ten to twenty percent of the weight of the entrails is added and mixed with them in any suitable container. The mixture is maintained at the ambient temperature, but not above 30° C., and stirred occasionally to prevent stratification or sedimentation and to accelerate solubilization. A daily stirring of three-fourths of an hour has been found sufficient. After a period of four to six days the entrails are completely solubilized and may be strained and further processed to utilize their food values. During the solubilization process no noticeable biological decomposition takes place. It is suspected that the urea causes solubilization of all biological species present.

Immediately after solubilization it is advantageous to concentrate the solubilized protein, in order to reduce its volume, improve its preservation and to render it more suitable to add to animal feed or to use for agricultural purposes. Concentration may be conveniently done in vacuum evaporators under a vacuum of at least twenty-eight inches of mercury to maintain an evaporation temperature below 45° C. Evaporation at higher temperatures has been found to tend to result in gellation of the product. A concentration to fifty to sixty-five percent solids is generally sufficient to give a product which is well preserved yet still fluid enough to be pumped. In this concentrated form it has the consistency of molasses.

The ten to twenty percent range of urea concentration specified has been found entirely satisfactory for solubilization of all the solid proteins specified above. If less than ten percent is present fermentation is likely to occur, although as little as five percent is often effective in causing solubilization. At the other extreme more than twenty precent is generally superfluous, but entirely usable. It is accordingly contemplated that during warm weather, when fermentation and putrefaction occur readily, the high end of this range is preferable and that during colder weather amounts closer to ten percent will be satisfactory.

The following specific example of the process of this invention as practiced on fresh cod entrails has been selected for purposes of illustration.

To 100 pounds of fresh cod entrails, with the livers removed for separate treatment, are added fifteen pounds of urea which are well stirred in. By fresh entrails are meant the entrails in their natural state, that is, with their natural content of water. The mixture is now allowed to stand at a temperature below 30° C. and stirred daily for about three-fourths of an hour until all the proteinaceous solid material is liquefied. Generally solubilization is well under way in two or three days with only the stomachs remaining. After an additional two or three days the stomachs are also solubilized. The resulting product is a cloudy tan liquid containing fine proteinaceous particles in suspension and having a characteristic fishy odor which is free from any putrid aromas.

The liquid may now be strained to remove pebbles and stones. It may be stored unrefrigerated without concentration for a period of two to three weeks, but preferably it is concentrated in solids content immediately after solubilization is complete to reduce its volume and enhance its state of preservation.

Concentration under a vacuum of twenty-eight inches of mercury to a solids content of fifty-five to sixty percent results in a thick reddish brown liquid having the not unpleasant strong aroma of anchovy paste. This concentrated product may be stored unrefrigerated for from six to eight months without appreciable decomposition.

In utilizing the process of this invention in the concentration of press water, to prevent gellation thereof, from seven to ten percent urea or more if desired, based on the total weight of the concentrated press water, may be added to the hot press water after concentration. The concentrated liquid may then be cooled without gellation or appreciable thickening. By varying the amount of urea added to the press water the fluidity of the resulting concentrate may be effectively controlled. Greater amounts of urea are to be used where high fluidity or high concentration are desired, and the lesser amounts where a thicker or less concentrated product is sought. Gelled concentrated press water may similarly be treated to liquefy it by adding seven to ten percent urea, preferably after melting the gel as by heating, and mixing it well in. Addition of the urea prior to concentration is not entirely satisfactory because of the tendency toward polymerization of urea and protein.

It will be understood from the foregoing that other proteinaceous products than entrails and press water may be treated to preserve and liquefy them by the process of this invention. One important application is in the recovery of fish liver oils from fish livers. The livers may be treated in the same manner as the entrails, except that it is not necessary to strain the liquid as foreign solids are seldom present. On liquefaction of the livers the desired oils separate as a surface layer occupying a volume of about one-sixth the total which may be removed by well known mechanical means, and further refined. If the oils are the only desired product, the step of concentrating the liquefied protein is unnecessary; the aqueous layer may be discarded. However, the aqueous layer is extremely rich in liver protein and vitamins and is therefore advantageously concentrated and also used as a food supplement.

The process of this invention may also be used to convert whole fish or fish scraps to a liquefied product free of bones. In the same manner in which entrails may be liquefied so may such scraps or whole fish, leaving the bones intact and susceptible to removal by straining. Similarly poultry entrails, livestock entrails and the entrails of marine mammals such as whales and seals, may to a large extent be solubilized. However, the tougher constituents of the stomachs of poultry and mammals have been found to resist solubilization.

It is not completely understood in what manner urea effects the solubilization and preservation of these proteinaceous materials. Apparently the urea causes the protein macromolecules, normally present as aggregates or bundles, to disperse, the protein remaining essentially in its original molecular form. It is noteworthy that proteolysis or hydrolysis of the protein does not occur to any appreciable extent as indicated by the negligible formation of proteolysis products such as peptones, polypeptides and amino acids.

Having thus disclosed my invention, I claim:

1. The process of liquefying proteinaceous animal material containing a substantial proportion of animal organs which consists in adding to said proteinaceous material in its natural state an amount of urea greatly in excess of that which would promote fermentation, said amount of urea being at least ten percent by weight of the proteinaceous material in its natural state, and maintaining the mixture in intimate contact at a temperature not substantially in excess of 30° C. until the proteinaceous material is liquefied.

2. The process of liquefying proteinaceous animal material containing a substantial proportion of animal organs which consists in adding to said proteinaceous material in its natural state an amount of urea greatly in excess of that which would promote fermentation, said amount of urea being at least ten percent by weight of the proteinaceous material in its natural state, maintaining the mixture in intimate contact at a temperature not substantially in excess of 30° C. until the proteinaceous material is liquefied, and evaporating water from the liquefied proteinaceous material to concentrate the material.

3. The process of extracting fish oils from fish oil containing fish products comprising adding ten to twenty percent by weight of urea to said fish product, maintaining the urea and fish product in intimate admixture at substantial neutrality at a temperature below 30° C. until the mixture is liquefied, and separating the fish oil from the surface thereof.

4. The process of extracting fish oils from fish livers comprising adding ten to twenty percent by weight of urea to the livers, maintaining the urea and livers in intimate admixture at substantial neutrality at a temperature below 30° C. until the mixture is solubilized, and separating the liver oil from the surface thereof.

5. In the process of concentrating press water comprising aqueous body fluids pressed from fish by evaporation to prevent gellation thereof, the step of adding to the hot press water from seven to ten percent by weight of urea, and maintaining the mixture at substantial neutrality.

References Cited in the file of this patent

UNITED STATES PATENTS

| | | |
|---|---|---|
| 2,391,387 | Bradshaw et al. | Dec. 25, 1945 |
| 2,508,599 | Elmslie | May 23, 1950 |
| 2,515,135 | Petty | July 11, 1950 |
| 2,565,173 | Fladmark | Aug. 21, 1951 |